March 4, 1969     J. F. PHILLIPS     3,430,371
INTERLEAVED MULTIPLE SLIDING PANEL SIX-MESSAGE DISPLAY DEVICE
Filed Dec. 6, 1966     Sheet 2 of 6
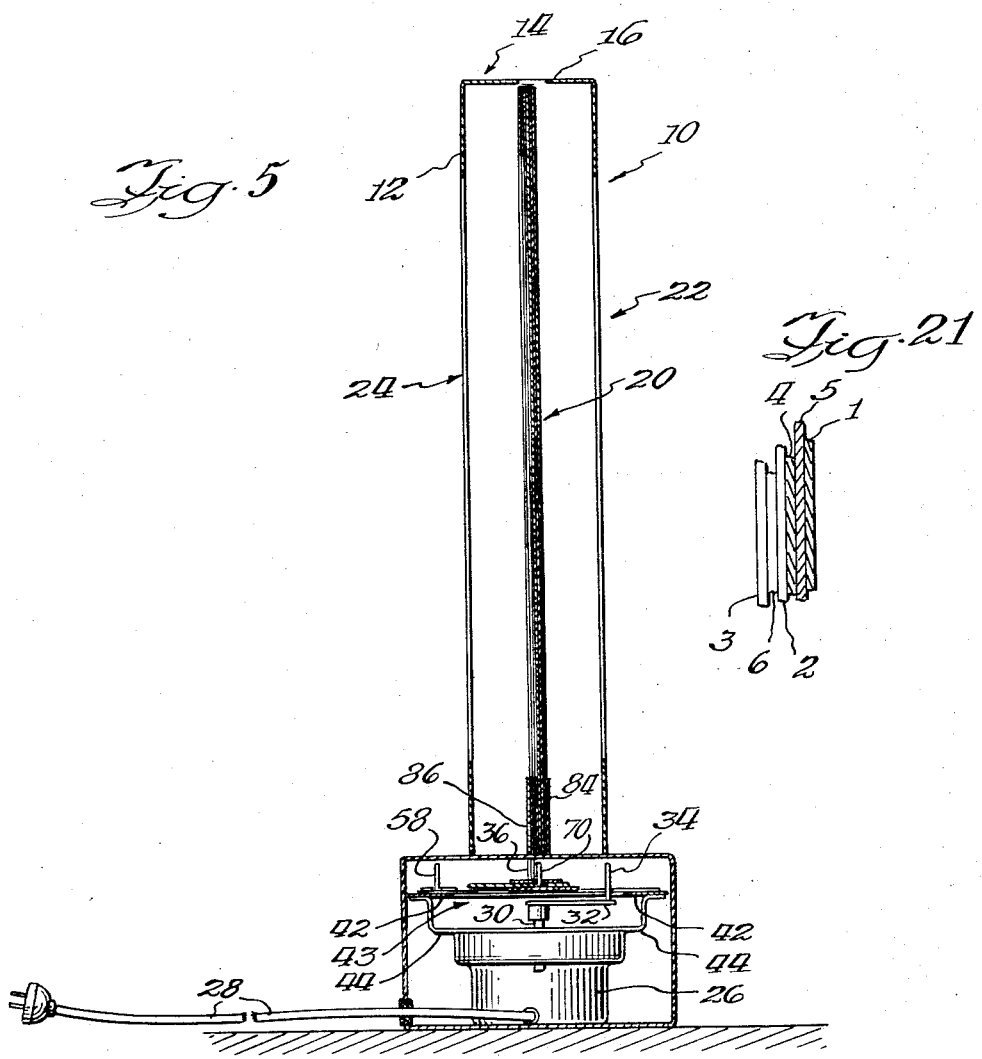
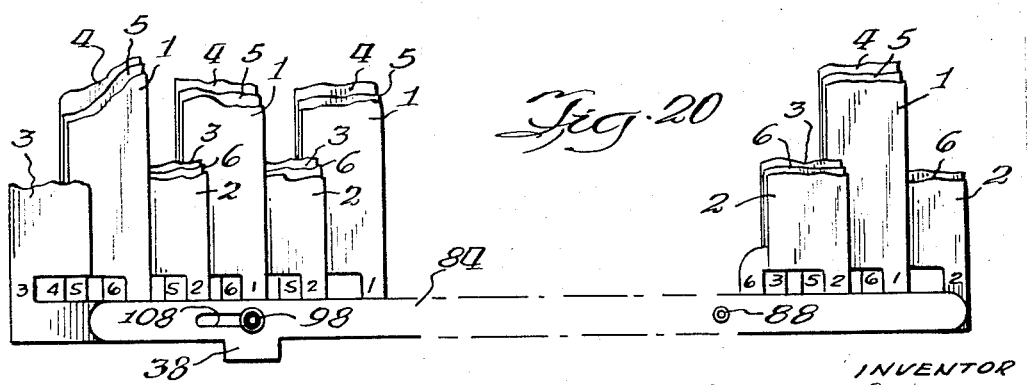
INVENTOR
John F. Phillips
BY Merriam, Marshall, Shapiro & Klose
ATTORNEYS

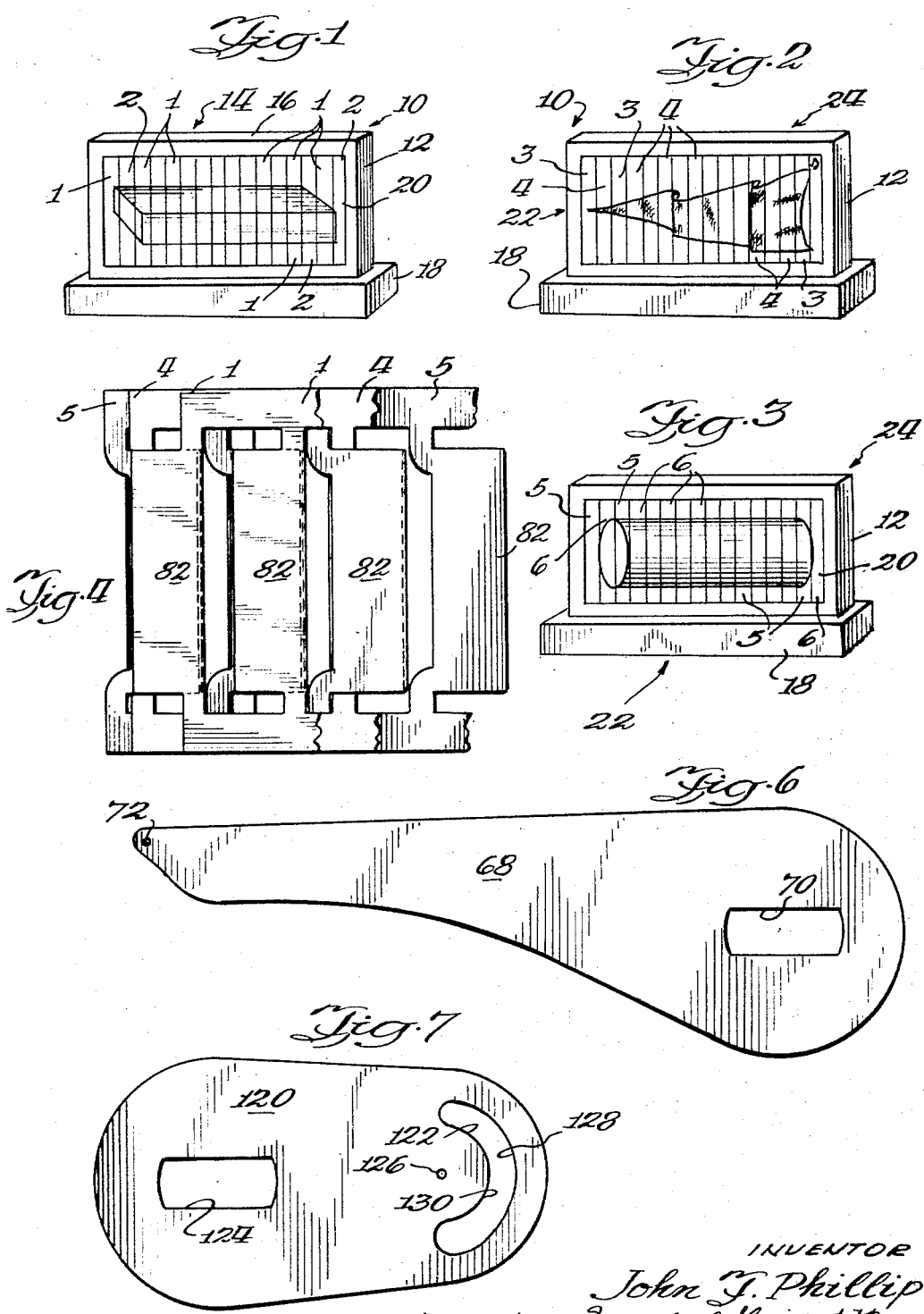

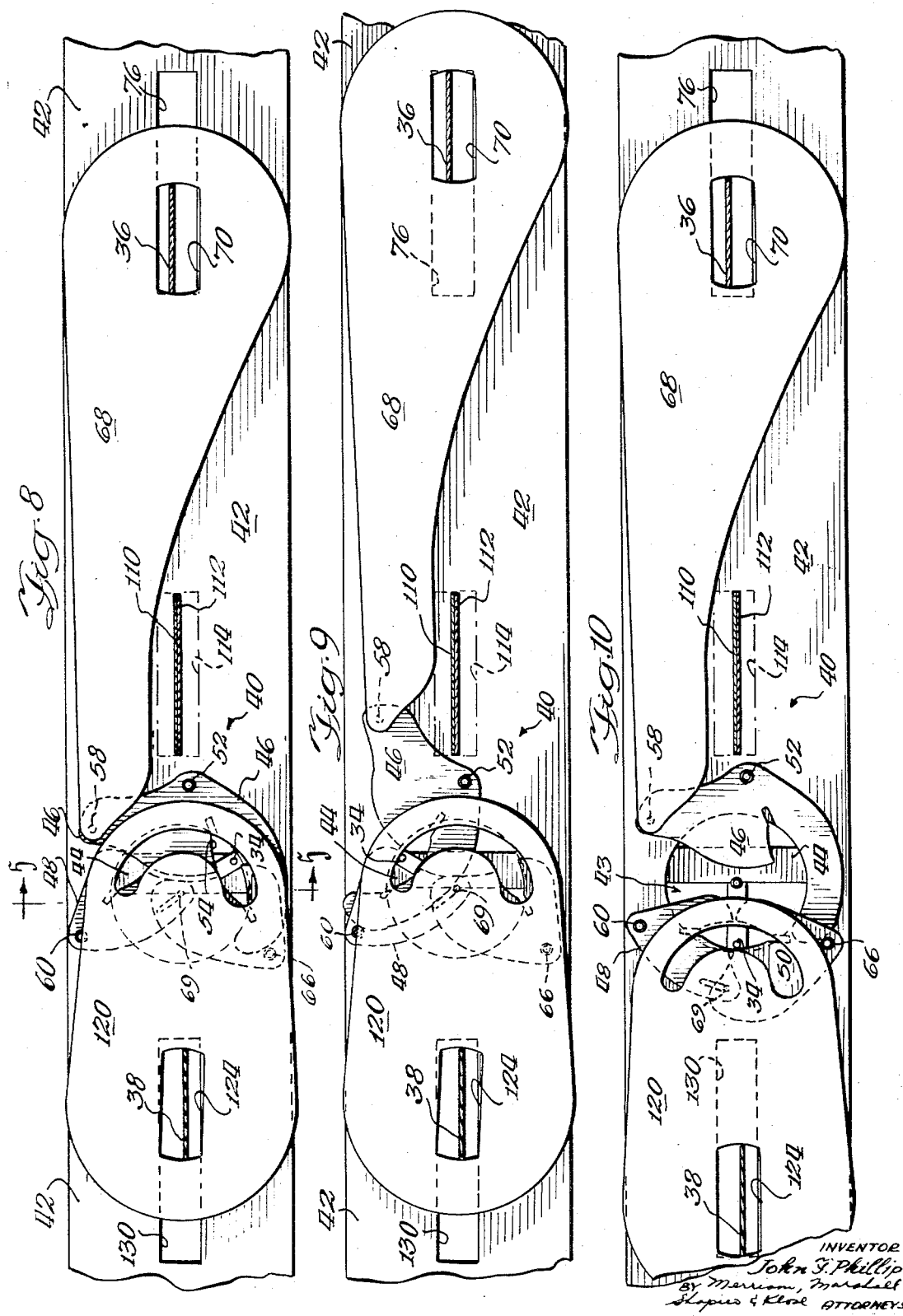

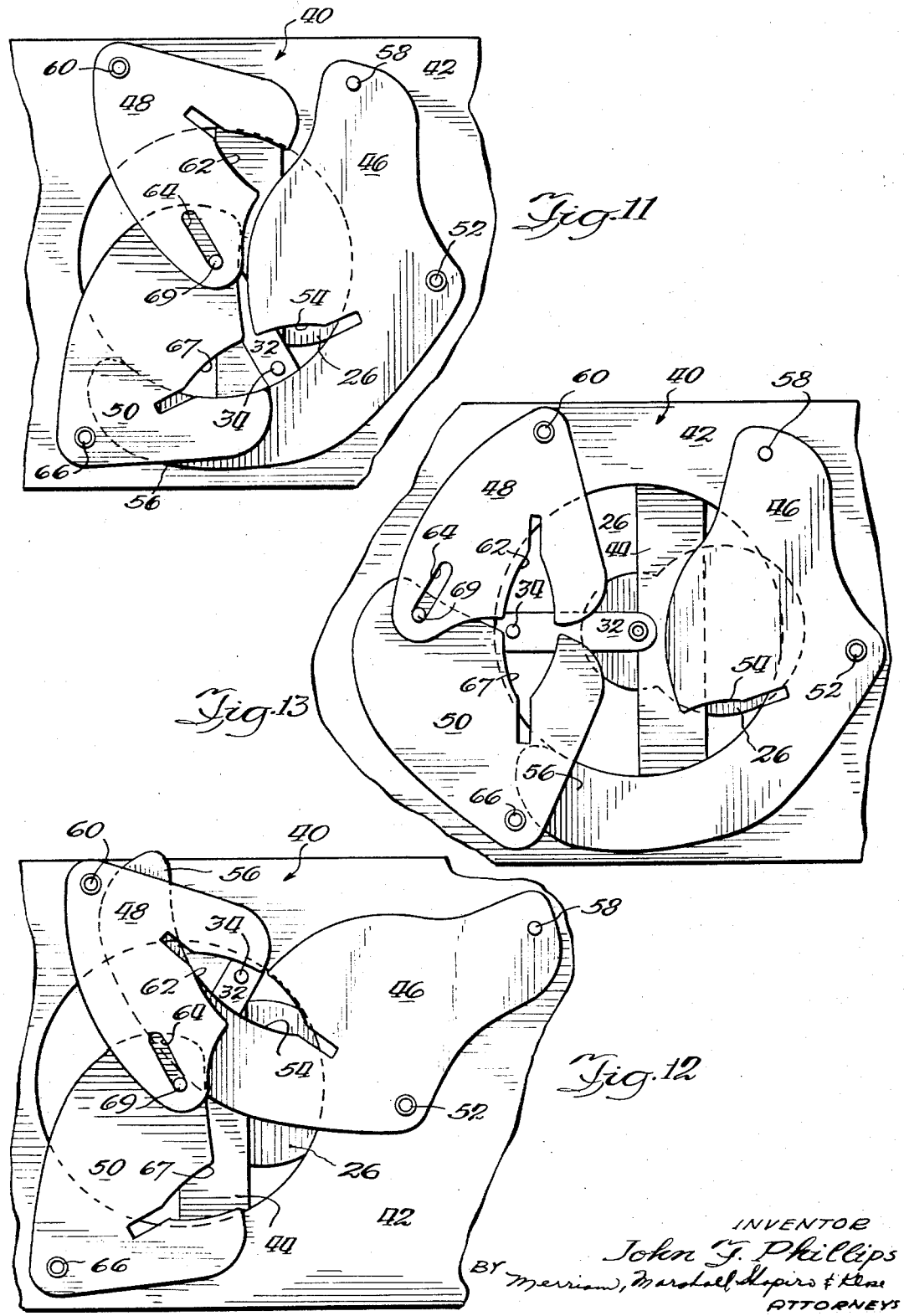

March 4, 1969  J. F. PHILLIPS  3,430,371
INTERLEAVED MULTIPLE SLIDING PANEL SIX-MESSAGE DISPLAY DEVICE
Filed Dec. 6, 1966  Sheet 5 of 6
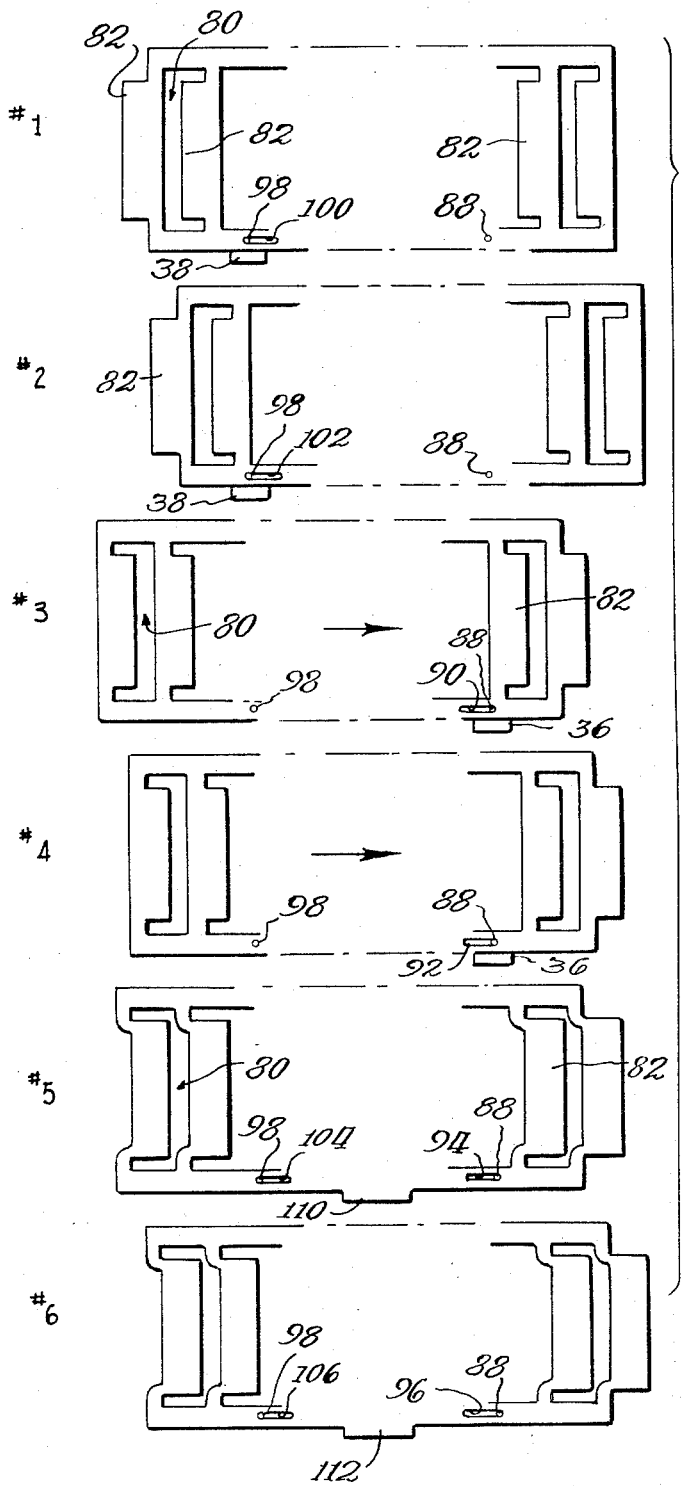
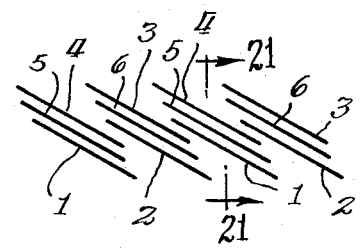
INVENTOR
John J. Phillips
BY Merriam, Marshall, Shapiro & Klose
ATTORNEYS INVENTOR
John J. Phillips
BY Merriam, Marshall, Shapiro & Klose
ATTORNEYS

United States Patent Office 3,430,371
Patented Mar. 4, 1969

3,430,371
INTERLEAVED MULTIPLE SLIDING PANEL SIX-MESSAGE DISPLAY DEVICE
John F. Phillips, Country Club Hills, Ill., assignor to National Advertising Company, Bedford Park, Ill., a corporation of Delaware
Filed Dec. 6, 1966, Ser. No. 599,590
U.S. Cl. 40—61    5 Claims
Int. Cl. G09f 11/06

ABSTRACT OF THE DISCLOSURE

The disclosure relates to a display device having three pairs of interleaved flat panels with composite display areas formed by each panel pair being sequentially alternately exposed. Two of the paired panels are movable to provide a display sequence in which one of the movable panels is moved in a first direction to expose a first message; the other of the movable panels is moved in the same direction to expose a second message; and the two movable panels are then moved in the opposite direction to expose a third message. The panels are provided in a replaceable display cartridge which can display six different messages from the display device.

---

This invention relates to display devices. It more particularly relates to a panel display device having a plurality of paired interleaving panels with composite display areas formed by each panel pair being alternately exposed.

Many types of display devices such as posters, billboards, etc., have been utilized for advertising various products. In order to increase the number of products displayed, or change the type of display format for a particular product, there has been devised displays having rotating four sided sections and sliding panel arrangements such that four different formats can be displayed. Generally, such display devices alternately expose two faces on each side of the device to form the four formats.

Some use has been made of a display device which is known in the advertising trade as a "slat sign." The slat sign is composed of a series of thin vertical panels having various displays thereon and arranged such that three different displays or formats can be presented when viewing the slat sign directly or from either side. In some instances a back-to-back slat sign configuration has been provided so that a total of six displays—three on each side of the format are possible. Such devices, however, require the viewer to change positions in order that a new display can be observed.

It has been particularly desired by those in the advertising trade to obtain a display device having more than two features or formats which can be displayed by viewer without a change in the viewer's position. It also has been desired to be able to readily interchange the display unit with a new unit having different features. Such a display device is especially adaptable for use in point-of-purchase advertising wherein the advertising material is placed immediately adjacent the product to be advertised. This required the display unit to be relatively inexpensive, to be relatively small in size or at least have a high ratio of advertising to overall area, and be relatively simple in operation so as to minimize any maintenance expenses.

In accordance with the present invention, there is provided at least three pairs of interleaved panels, with each pair of overlapping panels providing a composite display area on one side thereof, and wherein the panels are slidably moved with respect to each other for alternately exposing at least three different composite display areas. Thus, the present invention can provide a total of at least six displays—three on each side of the display unit.

In accordance with another aspect of this invention there is provided a display cartridge with at least three alternately movable pairs of panels, which cartridge is adapted so it can be readily interchanged in a display unit.

The invention will be better understood from the following detailed description thereof taken in conjunction with the accompanying drawings in which:

FIGURE 1 is a perspective view of a display device constructed in accordance with the principles of the present invention in which a first pair of slightly overlapping panels with a composite display area are exposed to provide a first display position;

FIGURE 2 is a perspective view of a display device according to the present invention illustrating a second pair of panels with a composite display area exposed to provide a second display position;

FIGURE 3 is a perspective view of a display device of this invention illustrating a third pair of panels with a composite display area exposed to provide a third display position;

FIGURE 4 is a fragmentary cutaway view illustrating the manner in which the pairs of panels are interleaved;

FIGURE 5 is a sectional view illustrating the display device of this invention;

FIGURES 6 and 7 are plan views illustrating two drive arms which are used to alternately slide the pairs of panels between the display positions illustrated in FIGURES 1–3;

FIGURES 8–10 illustrate the position of the drive mechanism and the two drive arms corresponding respectively to the display positions shown in FIGURES 1–3;

FIGURES 11–13 are enlarged views illustrating the position of the drive mechanism for various positions of the panel pairs;

FIGURE 14 is an elevational view illustrating the construction of each of the panels and in an exploded manner illustrating the relative positions of the panels in the first display position as shown in FIGURE 1;

FIGURE 15 is a schematic illustration of the relative front to back positions of the display panels corresponding to the display position shown in FIGURE 1;

FIGURE 20 is a fragmentary view illustrating a replaceable display cartridge having at least three composite display areas on one side thereof; and FIGURE 21 is a fragmentary sectional view illustrating the relative positions of the panels in the display cartridge.

Figure 16:
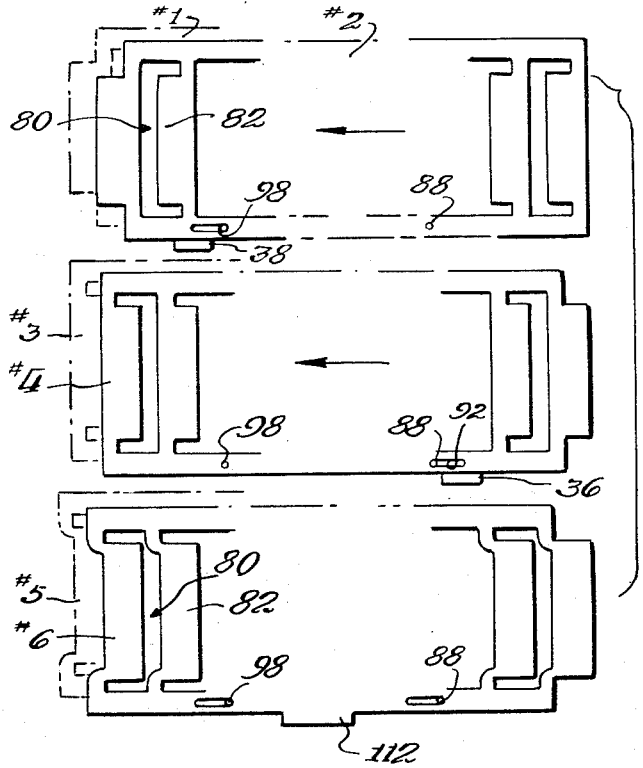
FIGURE 16 is an elevational view illustrating the relative positions of the panels corresponding to the display position as shown in FIGURE 2.

Referring now to FIGURE 1, there is illustrated a display device 10 constructed in accordance with the principles of the present invention and having at least three pairs of interleaved panels which are moveable with respect to each other to provide overlapping display positions formed by the composite display area of each pair. The display device 10 includes a support guide frame portion 12 having an open upper end 14 through which the display cartridge as hereinafter to be described can be inserted. The open end 14 can be closed off if desired as by means of an end plate 16 to prevent dust and other undesirable foreign objects from entering into the frame. A cover portion 18 immediately below the display support guide 12 encloses a drive mechanism for alternately moving a display panel assembly 20. The panel assembly or cartridge is inserted into the open end 14 and links with the drive mechanism.

FIGURE 1 illustrates a first position which for purposes of illustration may be termed the A position. In the A position the individual display areas associated with paired panels 1 and 2 of the panel assembly or display cartridge are exposed in an overlapping manner for display of the composite message container thereon.

FIGURE 2 illustrates a second or B position in which the display areas associated with paired panels 3 and 4 are exposed for composite display of the material contained thereon. Continuous movement of the drive mechanism links with the display panel assembly 20 exposes the individual display areas associated with panels 5 and 6 to form a third or C position as shown in FIGURE 3. With three pairs of display panels, the drive mechanism operating on the display panel assembly then exposes the display areas associated with panels 1 and 2 in the A position shown in FIGURE 1. Thus, three separate and distinct composite features or displays are possible from each side of the display device 10. With a similar display area on the reverse side of the display frame portion 12 a total of six separate and distinct displays are possible.

FIGURE 5 illustrates a sectional view of the display device 10 in which the panel assembly or display cartridge 20 is inserted into the guide frame portion 12. Suitable display openings 22 and 24 have been provided on the respective front and back sides of the frame 12 such that a total of six displays can be obtained. A motor 26 is mounted by suitable means within the cover portion 18 and is supplied power by means of a power cord 28. The motor 26 continuously rotates a shaft 30 to which is rigidly connected a rotating arm 32 having a drive pin 34 affixed at one end thereof. As will be shown in more detail hereinafter the driving pin 34 is coupled through a series of drive arms to link means, such as a tab 36, associated with each pair of display panels so as to alternately move the panels to expose the composite display areas from positions A through C as shown in FIGURES 1–3.

FIGURES 6–13 illustrate in more detail the drive means for alternately exposing the paired panels. FIGURES 8–10 and 11–13 represent respectively the position of the drive means 40 corresponding to the positions of the paired display panels shown in FIGURES 1–3. A shelf 42 within the cover portion 18 has a cutout section 43 through which the drive pin 34 protrudes. The drive pin 34 is of course continuously rotated by the motor 26 through the rotating arm 32 secured to the motor shaft 30. A support bracket 44 is attached to the motor 26 and to each end of the bottom of the shelf 42 so as to maintain the motor 26 in fixed position within the cover portion 18.

Referring to the detailed illustration of FIGURES 11–13, it can be seen that there are provided three irregular shaped pivoting cams 46, 48 and 50. Cam 46 is pivotally mounted to the shelf 42 by means of pin 52. On the cam 46 there is provided a guide mouth portion 54, a dog extension 56 and a drive post 58 which extends from the surface of the cam 46 so as to pivot therewith. Cam 48 is pivotally connected by means of pivot pin 60 to the shelf 42 and also includes a guide mouth 62 and an elongated slot 64. Cam 50 is similarly pivotally connected to the shelf 42 by means of a pivot pin 66 and also includes a guide mouth 67 and a drive post 69 extending from the surface of the cam 50. Note that the drive post 69 is slidably engaged within the slot 64 on cam 48.

FIGURE 11 illustrates the position of the cams and the rotating drive pin 34 with respect to display position A of the panels as shown in FIGURE 1. Note that the drive pin 34 (rotating counter clockwise) is about to engage the guide mouth 54 in the cam 46 so as to bear against the corresponding cam surface and thereby pivot cam 46 clockwise about the pivot pin 52. FIGURE 6 illustrates a drive arm 68 having a slot portion 70 at one end thereof and an aperture 72 at the other end. The aperture 72 movably engages the drive post 58 on cam 46 so that pivoting of the cam 46 about the pivot pin 52 will move the drive arm 68 in a rectilinear manner. It may be noted that the slotted end of the drive arm 68 is sized so as to slidably fit within the cover portion 18. Therefore, as the drive pin 34 is rotated by motor 26 so as to pivot the cam 46 from the position shown in FIGURES 8 and 11 to the position shown in FIGURES 9 and 12, the drive arm 68 is moved rectilinearly from the position shown in FIGURE 8 to that shown in FIGURE 9. The above described operation is coupled to the panel assembly or display cartridge 20 so as to change the composite display obtained from the exposure of panels 1 and 2 in position A shown in FIGURE 1 so as to expose panels 3 and 4 in position B as shown in FIGURE 2. To effect this operation link means such as tab 36 coupled to a corresponding pair of display panels is captured within the slot 70 of the drive arm 68. The shelf 42 contains a suitable elongated slot 76 at one end thereof so that movement of the drive arm 68 from the left hand portion of the slot 76 as shown in FIGURE 8 to the right hand portion of the slot 76 as shown in FIGURE 9 slidably moves the captured tab 36 to the right as shown in the drawings.

Referring to FIGURES 14 and 15 there is shown the relative position of the display panels 1–6 corresponding to display position A shown in FIGURE 1. FIGURE 14 is an exploded view to show the relative positions of the ends of the panels with respect to each other in display position A. Panels 1 and 2 are paired together such that they in a composite manner form the display shown in FIGURE 1. Panels 3 and 4 are similarly paired together, as also are panels 5 and 6. Each of the panels is constructed of a light weight paper, cardboard, or similar thin material and are each formed with a series of open areas 80 between a series of elongated protruding portions 82. The protruding portions 82 contain the individual display area, and the slight overlapping of these portions of respective paired panels provides the composite displays shown in FIGURES 1–3. The individual panels are die cut in a staggered manner so that each pair of panels such as 1 and 2, 3 and 4 or 5 and 6 provides a composite display when the individual panels are interleaved with corresponding protruding portions slightly overlapped. Reference may be had to FIGURES 4 and 20 wherein there is illustrated the manner in which the panels are interleaved with the protruding portions 82 slidably engaged within respective open areas 80.

The display panels 1–6 are maintained somewhat adjacent to each other by means of two elongated border strips 84 and 86 which are shown in the cross sectional view of FIGURE 5. FIGURE 20 illustrates the display panel assembly 20 with the front border strip 84 at the bottom end thereof. The borders 84 and 86 are formed of relatively heavy paper, cardboard, or similar material somewhat heavier than the material used to construct the display panels. An eyelet 88 passes through a slot (not shown) in border strip 86, slots 90, 92, 94 and 96 respectively in display panels 3–6, through suitable apertures in the display panels 1, 2 and through border strips 84 so as to directly intercouple movements in strip 84 with paired panels 1 and 2. Note that as the eyelet 88 moves within the slots 90–96 in respective display panels 3–6, only display panels 1 and 2 will move. A slot (not shown) in the border strip 86 also permits selective movement of display panels 1 and 2 with respect to the border strip 86. Thus, it can be seen from FIGURE 20 that whenever the tab 38 protruding from the border strip 84 is moved, panels 1 and 2 will also move.

Border strip 86 on the opposite side of the display panel assembly 20 is connected by means of an eyelet 98 passing through suitable apertures in the border strip 86 and panels 3 and 4 to the border strip 84. Note that eyelet 98 passes through slots 100 and 102 in panels 1 and 2, slots 104 and 106 in panels 5 and 6, and the slot 108 in border strip 84. Therefore, movement of eyelet 98 within slots 100–108 will move only display panels 3 and 4. As shown in FIGURES 5 and 14, tab 36 extends from border strip 86 so that movement of tab 36 will always move panels 3 and 4. Panels 5 and 6 are provided with stationary extension tabs 110 and 112, respectively. Tabs 110 and 112 are captured within a middle slot 114 in the shelf 42. Panels 5 and 6 are therefore always maintained in a stationary position.

Figure 17:
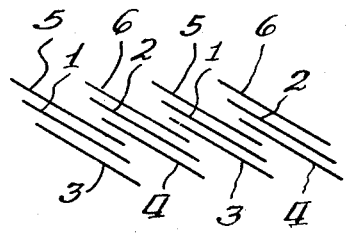
FIGURE 17 is a schematic illustration of the front to back position of the panels corresponding to the display position shown in FIGURE 2.
Figure 18:
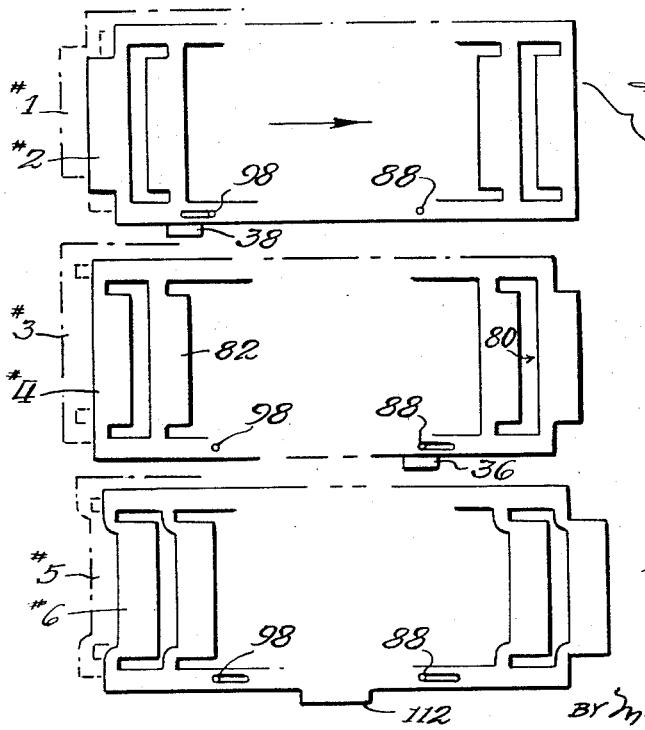
FIGURE 18 is an elevational view illustrating the relative side to side position of the display panels corresponding to the display position as shown in FIGURE 3.
Figure 19:
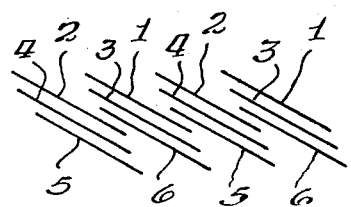
FIGURE 19 is a schematic illustration of the front to back position of the panels corresponding to the display position shown in FIGURE 3.

FIGURES 16 and 17 illustrate the relative positions of the paired panels 1 and 2, 3 and 4, 5 and 6, in display position B corresponding to FIGURE 2. Similarly, FIGURES 18 and 19 illustrate the relative positions of the display panels for display position C as shown in FIGURE 3. The reference arrows on FIGURES 14, 16, and 18 illustrate the panels which are moved and the direction in which they are moved in going from the respective illustrated position to the subsequent display position. For instance, referring to FIGURE 14 display panels 3 and 4 are moved to bring the display device into position B shown in FIGURE 2 (the relative positions of the panels are shown in FIGURE 16). In moving from display position B to position C the reference arrows as shown in FIGURE 16 illustrate the movement and the direction of such movement of panels 1, 2, and 3, 4. This exposes the display area on the panels 5 and 6 in position C as shown in FIGURE 3 (the relative positions of the display panels is shown in FIGURE 18). Movement of panels 1 and 2 as shown in FIGURE 18 again reverts the display device to position A as shown in FIGURE 1.

With the movements of the panels from one display position to another having been described, there will now be described the mechanism for producing such movement. A second drive arm 120 having a semicircular slot 122 at one end thereof and an elongated slot 124 at the other end thereof is superimposed upon cams 46, 48 and 50 so that drive post 69 protrudes through an aperture 126 in drive arm 120. Semicircular slot 122 is formed in a manner to enable the rotating drive pin 34 to ride along outer slot edge 128 in one rotary position and along inner slot edge 130 in a second rotary position. Notice also that one end of the drive arm 120 is sized so as to allow the drive arm 120 to slidingly fit within the cover portion 18.

The operation of the drive mechanism to move the display panels from one position to another will now be described. In display position A as shown in FIGURE 1, the display areas of the front side of panels 1 and 2 and the back side of panels 3 and 4 are exposed for display purposes, thereby providing two composite displays. This can be most easily seen by referring to FIGURES 1 and 15. The drive mechanism 40 is in the position as shown in FIGURE 8. As the drive pin 34 is rotated counterclockwise to engage the guide mouth 54 of cam 46, the cam 46 is pivoted about the pivot pin 52 thereby moving drive post 58 in a clockwise direction and extending drive arm 68 to the position as shown in FIGURE 9. Note that tab 36 which is an extension of rear border strip 86 is captured within the drive arm 68. Furthermore, rear border strip 86 is connected by means of eyelet 98 to panels 3 and 4. Therefore, as the drive arm 68 moves from the position shown in FIGURE 8 to that shown in FIGURE 9, display panels 3 and 4 also move (as shown by the reference arrows in FIGURE 14) to the display position B shown in FIGURES 16 and 17 corresponding also to FIGURE 2. Notice that no other panels except panels 3 and 4 were moved during the change in display position from A to B, since as shown in FIGURE 14 and 16 the eyelet 98 merely slides in slots 100, 102, 104 and 106 of respective display panels 1, 2, 5, and 6.

As the drive pin 34 continually rotates in a counter clockwise manner it engages guide mouth 62 on cam 48 (see FIGURE 12) so as to rotate cam 48 in a clockwise manner about pivot pin 60. Through the engagement of drive post 69 in slot 64, clockwise movement of cam 48 provides counterclockwise movement of cam 50 about pivot pin 66. Pin 69 thereby moves substantially in a rectilinear manner from the position shown in FIGURE 12 to that shown in FIGURE 13 which as can be seen from FIGURES 9 and 10 moves drive arm 120 in a similar manner. Note that tab 38 which is an extension of front border strip 84 is captured within slot 124 of drive arm 120 and protrudes through an elongated slot 130 at one end of the shelf 42. Therefore, movement of the drive arm 120 from the position shown in FIGURE 9 to that shown in FIGURE 10 slides the tab 38 from the right hand portion of slot 130 to the left hand portion thereof. Tab 38 which is an extension of front border strip 84 is connected through eyelet 88 to panels 1 and 2. Therefore, as shown in FIGURE 16 as panels 1 and 2 are moved in the direction of the reference arrows panels 3 and 4 are also moved since the eyelet 88 butts against one end of slot 92 in panel 4 and slot 90 in panel 3.

Furthermore, as the drive pin 34 is rotated to engage in the guide mouth 62, it also engages the dog extension 56 of cam 46 so that the cam 46 is rotated in a counter clockwise manner around the pivot pin 52. This operation moves the drive arm 68 to thereby also aid in moving panels 3 and 4 which are coupled to tab 36 captured in slot 70 of drive arm 68. The display panels are now in position C so that the composite display area on the front side of panels 5 and 6 are exposed, and the composite display area on the back side of panels 1 and 2 are also exposed.

As the drive pin 34 rotates as shown in FIGURES 10 and 13 so as to contact guide mouth 67, cam 50 is driven in a clockwise manner around pivot pin 66 to thereby move drive post 69 to the right and into the position shown in FIGURES 8 and 11. When the drive arm 120 is moved toward the right as shown in the drawings the captured tab 38 in slot 124 moves front border strip 84 and eyelet 98 which are attached to paired panels 1 and 2 also towards the right as shown in FIGURE 18. Thus, the display device reverts back to position A as shown in FIGURE 1.

Therefore, it can be seen that in accordance with the principles of the present invention there has been provided a display device having at least three pairs of interleaving panels with display areas formed from the composite display areas of paired panels, the pairs of panels being moved with respect to each other so as to alternately change the composite displays. While the present invention is illustrated in connection with three pairs of panels, it is to be understood that four or more pairs of panels can also be provided if desired in an interleaving manner according to the teachings herein.

Turning now to another aspect of the present invention, it can be seen that the display panel assembly 20 is incorporated into a readily replaceable display cartridge. Notice that to change display panel assemblies it is only necessary to lift the assembly 20 out of the frame portion 12 so as to disengage the tabs 36 and 38 from the slots in the drive mechanism and in the shelf 42. Another display panel assembly can be inserted into the frame portion 12 until similar tabs are engaged within the respective slots. Therefore, in accordance with this aspect of the invention there has been provided a readily changeable display cartridge for a display device having the capability of at least three displays on each side of the device.

It is within the teachings of the present invention to provide other drive means well known within the skill of the art to alternately move the display panels. For instance, the display panel assembly 12 can be hung by means of clamps or other means to the inside of the frame portion 12 with the alternating movement being obtained by driving tabs located either at the top or at the bottom of the display panels. Alternatively, the tabs can be placed at the top of the display assembly with the entire assembly bottomed inside of a support frame and the relative movement of the display panels obtained by drive means coupled to the top thereof.

Therefore, the foregoing detailed description has been given for clearness of understanding only, and no unnecessary limitations should be understood therefrom, as modifications will be obvious to those skilled in the art.

What is claimed is:

1. An interleaving panel display device comprising:
   a frame having a display opening at least on one side thereof;
   three pairs of interleaved panels in a substantially flat panel display configuration, each pair having a composite display area composed of the slight overlapping of elongated display areas associated with the panels in each respective pair;
   a pair of border strips along one edge and on opposite sides of said interleaved panels for maintaining said panels in position immediately adjacent each other;
   first securing means interconnecting a first pair of said panels with one of said border strips for slidable movement therewith with respect to said other panel pairs;
   second securing means interconnecting a second pair of said panels with the other of said border strips for slidable movement therewith with respect to said other panel pairs;
   holding means within said frame and associated with a third pair of said interleaved panels to prevent slidable movement of said third panel pair with respect to said frame during slidable movement of said first and second panel pairs;
   first power driven means in said frame detachably engaging one of said border strips for moving said first pair of panels in a first direction to expose said composite display area associated with said first panel pair;
   second power driven means in said frame detachably engaging the other of said border strips for slidably moving said second pair of panels in said first direction to expose said composite display area associated with said second panel pair; and
   third power driven means in said frame detachably engaging each of said pair of border strips for slidably moving said first and second pairs of panels in a direction opposite to said first direction to expose said composite display area associated with said third panel pair;
   said first, second and third power driven means sequentially operating to alternately expose the respective composite display area associated with the first, second and third pairs of said panels at said frame display opening.

2. An interleaving panel display device as claimed in claim 1, wherein each of said border strips includes a projecting tab, said tab projecting from opposite ends of said border strips, said holding means including a holding tab projecting from said third pair of panels and slot means including a slot within said frame, said holding tab detachably engaging said slot, and said first, second and third power driven means detachably engaging said respective tabs for selectively moving said first and second pairs of panels with respect to said third panel pair.

3. An interleaving panel display device as claimed in claim 2, wherein said first, second and third power driven means includes a pair of drive arms each having one end detachably engaging one of said projecting tabs, motor means including a rotatingly driven member for operating said panels, and cam means pivotally mounted to said frame and said drive arms and sequentially engaging said rotatingly driven member for sequentially moving said drive arms to slidably move said panels and sequentially expose said composite display areas.

4. An interleaving panel display device as claimed in claim 1, wherein said frame includes a second display opening on the other side of said frame, each of said three pairs of panels including a second composite area on the opposite side of said first mentioned composite display area, said two composite display areas of each panel being sequentially exposed at said respective display openings in said frame.

5. An interleaving panel display comprising:
   three pairs of interleaved panels in a substantially flat panel display configuration, each pair having a composite display area composed of the slight overlapping of elongated display areas associated with the panels in each respective pair;
   link means associated with each pair of panels for enabling said panels to slidably move with respect to each other;
   drive means selectively engaging said link means associated with two of said pairs of panels to individually slidably move said two panel pairs;
   said link means detachably engaging said drive means to readily enable replacement of said three pairs of interleaved panels; and
   said link means comprising a pair of tabs each associated with a respective one of said movable pairs of panels, and holding means associated with said remaining panel pair for maintaining said remaining panel pair in position during slidable movement of said two movable panel pairs, said tabs being selectively engaged by said drive means to alternately expose said respective composite display areas.

References Cited

UNITED STATES PATENTS

| | | | |
|---|---|---|---|
| 786,334 | 4/1905 | Wood | 40—62 |
| 2,799,105 | 7/1967 | Tilley | 40—62 |
| 3,102,350 | 9/1963 | Dixon | 40—65 |

EUGENE R. CAPOZIO, *Primary Examiner.*

W. J. CONTRERAS, *Assistant Examiner.*